United States Patent
Barnett

(10) Patent No.: US 10,206,384 B2
(45) Date of Patent: Feb. 19, 2019

(54) FISHING BOBBER

(71) Applicant: Robert H. Barnett, Oriental, NC (US)

(72) Inventor: Robert H. Barnett, Oriental, NC (US)

(*) Notice: Subject to any disclaimer, the term of this patent is extended or adjusted under 35 U.S.C. 154(b) by 168 days.

(21) Appl. No.: 15/441,378

(22) Filed: Feb. 24, 2017

(65) Prior Publication Data

US 2017/0245485 A1 Aug. 31, 2017

Related U.S. Application Data

(60) Provisional application No. 62/301,258, filed on Feb. 29, 2016.

(51) Int. Cl.
| | |
|---|---|
| *A01K 93/00* | (2006.01) |
| *A01K 85/01* | (2006.01) |
| *A01K 85/12* | (2006.01) |
| *A01K 91/08* | (2006.01) |

(52) U.S. Cl.
CPC .......... *A01K 93/00* (2013.01); *A01K 85/01* (2013.01); *A01K 85/12* (2013.01); *A01K 91/08* (2013.01)

(58) Field of Classification Search
CPC ......... A01K 93/00; A01K 85/01; A01K 85/12
See application file for complete search history.

(56) References Cited

U.S. PATENT DOCUMENTS

| | | | |
|---|---|---|---|
| 1,575,216 A | 3/1926 | Kuehn et al. | |
| 2,128,899 A | 9/1938 | Barnhart | |
| 2,162,659 A | 6/1939 | Wilson | |
| 2,208,240 A | 7/1940 | Arnesen et al. | |
| 2,239,813 A | 4/1941 | Dubell | |
| 2,255,853 A | 9/1941 | Makus et al. | |
| 2,493,971 A | 1/1950 | Johnson | |
| 2,527,437 A | 10/1950 | Matras | |
| 2,535,907 A | 12/1950 | Dolejs | |
| 2,571,808 A | 10/1951 | Aldinger, Jr. | |
| 2,578,852 A | 12/1951 | Sokolik | |
| 2,582,619 A * | 1/1952 | William | A01K 93/00 43/44.9 |
| 2,597,836 A | 5/1952 | Klie | |
| 2,598,378 A | 5/1952 | Hodges | |
| 2,642,691 A | 6/1953 | Harshman | |
| 2,670,560 A | 3/1954 | Matras | |
| 2,678,511 A | 5/1954 | Wright | |
| 2,700,841 A * | 2/1955 | Johnson | A01K 93/00 43/17 |

(Continued)

FOREIGN PATENT DOCUMENTS

| | | | | |
|---|---|---|---|---|
| DE | 102010032139 A1 * | 1/2012 | ............. | A01K 93/00 |
| GB | 2456052 A * | 7/2009 | ............. | A01K 91/03 |

*Primary Examiner* — Christopher P Ellis
(74) *Attorney, Agent, or Firm* — Dale J. Ream

(57) ABSTRACT

A hollow-bodied frustoconical fishing bobber has a top section with a semi-spherical, concave top surface with a line aperture in the bottom of the semi-spherical top surface and a depending tube through which a fishing line may extend. Below the top section are two hollow semi-cylindrical halves with bottom walls that are joinable together and connectable to the bottom of the top section with the depending tube passing through and ending at the joinable bottom walls. A continuous helical fin in three sections is on the outer surface of the top section and two semi-cylindrical halves which causes the fishing bobber to spin about it radial axis. Weights are locating with the hollow body.

12 Claims, 4 Drawing Sheets

(56) References Cited

U.S. PATENT DOCUMENTS

| | | | |
|---|---|---|---|
| 2,707,347 A | 5/1955 | Sneed | |
| 2,719,381 A | 10/1955 | Matras | |
| 2,722,769 A | 11/1955 | Blockinger, Sr. et al. | |
| 2,729,015 A | 1/1956 | Finnegan | |
| 2,754,609 A | 7/1956 | Schultz | |
| 2,760,295 A * | 8/1956 | Bond | A01K 93/00 43/43.11 |
| 2,764,838 A | 10/1956 | Singer | |
| 2,769,268 A * | 11/1956 | Miller | A01K 85/01 43/42.06 |
| 2,775,843 A | 1/1957 | Leiser | |
| 2,778,146 A | 1/1957 | Peck | |
| 2,785,499 A | 3/1957 | Simpson | |
| 2,787,079 A | 4/1957 | Wilson | |
| 2,793,447 A | 5/1957 | King | |
| 2,815,604 A | 12/1957 | Fiscus | |
| 2,817,923 A | 12/1957 | Wertz | |
| 2,826,850 A | 3/1958 | Laudan | |
| 2,863,254 A | 12/1958 | Kercher, Sr. | |
| 2,867,936 A | 1/1959 | Lambach | |
| 2,881,552 A | 4/1959 | Miller | |
| 2,887,816 A | 5/1959 | Hudkins | |
| 2,888,773 A | 6/1959 | Hudkins | |
| 2,910,798 A | 11/1959 | Bias | |
| 2,931,124 A | 4/1960 | Johnston | |
| 2,937,469 A | 5/1960 | Tiede | |
| 3,012,358 A * | 12/1961 | Multanen | A01K 85/12 43/42.28 |
| 3,041,771 A | 7/1962 | Hreno | |
| 3,137,961 A * | 6/1964 | Bowers | A01K 93/00 43/43.1 |
| 3,141,256 A | 7/1964 | McBriar | |
| 3,154,878 A | 11/1964 | Ekstrand | |
| 3,161,982 A | 12/1964 | Lee | |
| 3,208,182 A | 9/1965 | Holthaus | |
| 3,323,247 A | 6/1967 | Murray | |
| 3,577,669 A * | 5/1971 | Johnson | A01K 93/00 43/43.11 |
| 3,633,305 A | 1/1972 | Grubb | |
| 3,645,030 A | 2/1972 | Milburn, Jr. | |
| 3,672,087 A | 6/1972 | Milburn, Jr. | |
| 3,693,278 A | 9/1972 | Mahone, Jr. | |
| 3,753,309 A | 8/1973 | Bryant | |
| 3,827,175 A | 8/1974 | Howard | |
| 3,990,172 A | 11/1976 | Hagquist | |
| 4,060,925 A | 12/1977 | Bias | |
| 4,090,318 A | 5/1978 | Webster | |
| 4,109,404 A | 8/1978 | Preeschl | |
| 4,144,666 A | 3/1979 | Maycock et al. | |
| 4,167,077 A | 9/1979 | Louthan | |
| D255,919 S | 7/1980 | Crofton | |
| 4,234,913 A | 11/1980 | Ramme | |
| D267,108 S | 11/1982 | Learned, III | |
| 4,361,978 A | 12/1982 | Kane | |
| 4,382,345 A * | 5/1983 | Bassett | A01K 85/16 43/42.17 |
| 4,406,081 A | 9/1983 | Gamer | |
| 4,449,318 A | 5/1984 | Lane | |
| 4,477,995 A | 10/1984 | Fenn | |
| 4,516,349 A | 5/1985 | Klocksiem | |
| 4,574,515 A | 3/1986 | Gamer | |
| 4,656,777 A | 4/1987 | Fernbach | |
| 4,713,031 A | 12/1987 | Fuller | |
| 4,748,760 A | 6/1988 | Widmer | |
| 4,799,328 A | 1/1989 | Goldman | |
| 4,809,461 A | 3/1989 | Capen | |
| 4,873,784 A | 10/1989 | Petron | |
| 4,884,355 A | 12/1989 | Neihoff et al. | |
| 4,891,902 A | 1/1990 | Whitney, Jr. | |
| 4,916,846 A | 4/1990 | Pehm | |
| D307,932 S | 5/1990 | Reed | |
| 5,077,928 A | 1/1992 | Deskevich | |
| 5,086,581 A | 2/1992 | Barra et al. | |
| 5,111,609 A | 5/1992 | Flo | |
| 5,119,578 A | 6/1992 | Johnson | |
| D332,820 S | 1/1993 | O'Brien et al. | |
| D334,792 S | 4/1993 | Flemming | |
| 5,230,178 A * | 7/1993 | Dillard | A01K 83/06 43/42.31 |
| 5,231,787 A | 8/1993 | Chuang | |
| 5,235,777 A | 8/1993 | Burns | |
| D343,226 S | 1/1994 | Sheilds | |
| 5,287,646 A | 2/1994 | Kuhlman | |
| 5,327,672 A | 7/1994 | Johnson | |
| 5,329,722 A * | 7/1994 | Wilson | A01K 93/00 43/44.87 |
| 5,359,804 A | 11/1994 | Burns | |
| 5,361,532 A | 11/1994 | Moff | |
| 5,373,659 A | 12/1994 | Neese, Jr. | |
| 5,398,440 A | 3/1995 | Amundson | |
| 5,412,898 A | 5/1995 | Crain | |
| 5,428,921 A | 7/1995 | Lancieri | |
| 5,440,831 A | 8/1995 | Chandler | |
| 5,456,041 A | 10/1995 | Schoeberlein | |
| 5,507,112 A | 4/1996 | Cheney, Jr. | |
| 5,528,851 A | 6/1996 | Feher | |
| 5,675,927 A | 10/1997 | Kloos | |
| 5,713,152 A | 2/1998 | Domack | |
| 5,737,868 A | 4/1998 | Rikard | |
| 5,758,451 A | 6/1998 | Wolfe | |
| 5,775,025 A | 7/1998 | Ooten | |
| 5,784,829 A | 7/1998 | Latta | |
| D405,155 S | 2/1999 | Zaharia et al. | |
| 5,915,941 A | 6/1999 | Casey | |
| 5,937,566 A | 8/1999 | Buczkowski et al. | |
| D414,238 S | 9/1999 | Kupperman | |
| 5,953,852 A | 9/1999 | Nichols | |
| D415,243 S | 10/1999 | Chestnut | |
| 5,987,806 A | 11/1999 | Spencer | |
| D419,636 S | 1/2000 | Houston | |
| 6,138,398 A | 10/2000 | Livingston | |
| 6,158,164 A | 12/2000 | Mack et al. | |
| 6,173,524 B1 | 1/2001 | Kinchen, Sr. | |
| 6,176,035 B1 * | 1/2001 | Somogyi | A01K 85/12 43/42.14 |
| D441,046 S | 4/2001 | Viano | |
| 6,389,736 B1 | 5/2002 | Frost | |
| 6,397,510 B1 | 6/2002 | Klein | |
| 6,425,200 B1 | 7/2002 | Bennis | |
| D469,155 S | 1/2003 | Bill | |
| 6,612,066 B1 | 9/2003 | James | |
| 6,671,994 B1 | 1/2004 | Klein | |
| 6,836,997 B2 * | 1/2005 | Cramsey | A01K 93/00 43/42.06 |
| 6,880,283 B2 | 4/2005 | Holmes | |
| 6,880,288 B1 | 4/2005 | Hanes | |
| 6,993,866 B1 * | 2/2006 | Strange | A01K 85/01 43/42.31 |
| D549,801 S | 4/2007 | Pruess et al. | |
| 7,225,580 B1 | 6/2007 | Chou | |
| D552,707 S | 10/2007 | Taft | |
| 7,437,851 B2 | 10/2008 | Bennis | |
| 7,454,863 B1 | 11/2008 | Holsey | |
| 7,478,498 B1 | 1/2009 | Barnhart | |
| 7,520,086 B2 * | 4/2009 | Melhorn | A01K 91/06 43/42.06 |
| D599,876 S | 9/2009 | Hughes, Jr. | |
| D619,416 S | 7/2010 | Bailey et al. | |
| D633,172 S | 2/2011 | Johnson | |
| 7,913,445 B2 | 3/2011 | St. Germain | |
| 8,627,593 B1 | 1/2014 | Schepp et al. | |
| D699,811 S | 2/2014 | Stafford et al. | |
| D734,421 S | 7/2015 | Bennis | |
| D734,422 S | 7/2015 | Bennis | |
| D744,061 S | 11/2015 | Dick et al. | |
| D745,946 S | 12/2015 | Herlitzka | |
| 9,497,949 B1 * | 11/2016 | Bass, Jr. | A01K 93/00 |
| D816,186 S * | 4/2018 | Hoge | D22/146 |
| 2002/0157300 A1 * | 10/2002 | Saul | A01K 85/00 43/42.33 |
| 2005/0246941 A1 * | 11/2005 | Mitchell | A01K 85/00 43/42.36 |

(56) References Cited

U.S. PATENT DOCUMENTS

| | | | |
|---|---|---|---|
| 2010/0031554 A1* | 2/2010 | Brooks, Jr. | A01K 85/01 43/44.87 |
| 2011/0131863 A1* | 6/2011 | Parcell | A01K 85/02 43/41 |
| 2012/0073183 A1* | 3/2012 | Kissee | A01K 93/00 43/43.14 |
| 2013/0283669 A1* | 10/2013 | da Rosa | A01K 93/00 43/44.9 |
| 2014/0311011 A1* | 10/2014 | Guntharp | A01K 85/12 43/42.09 |
| 2015/0013211 A1* | 1/2015 | Schoenike | A01K 93/00 43/44.91 |
| 2017/0295770 A1* | 10/2017 | Schoenike | A01K 91/03 |

* cited by examiner

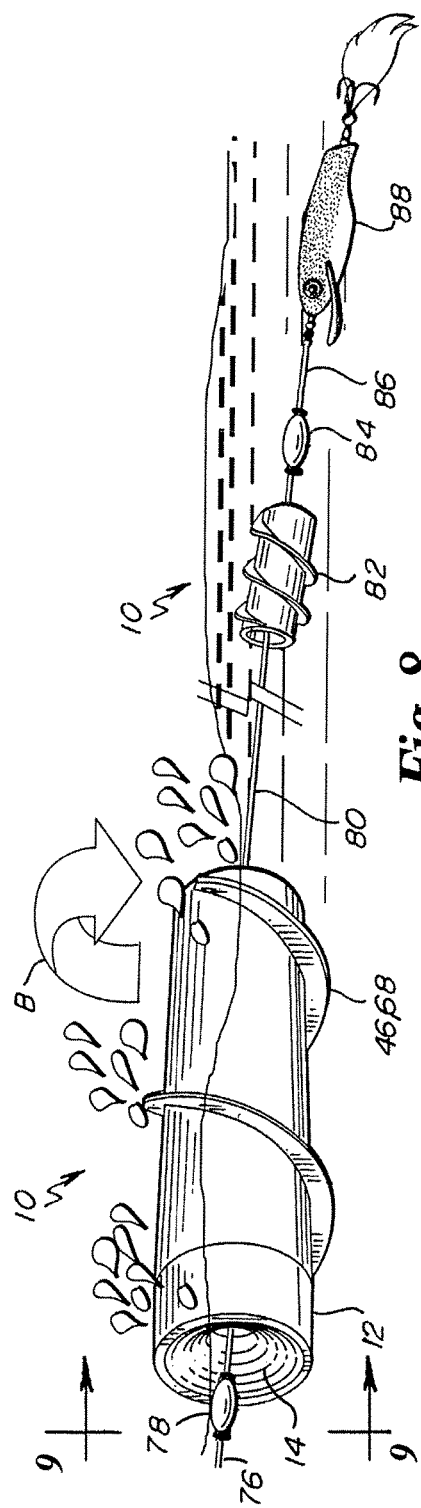
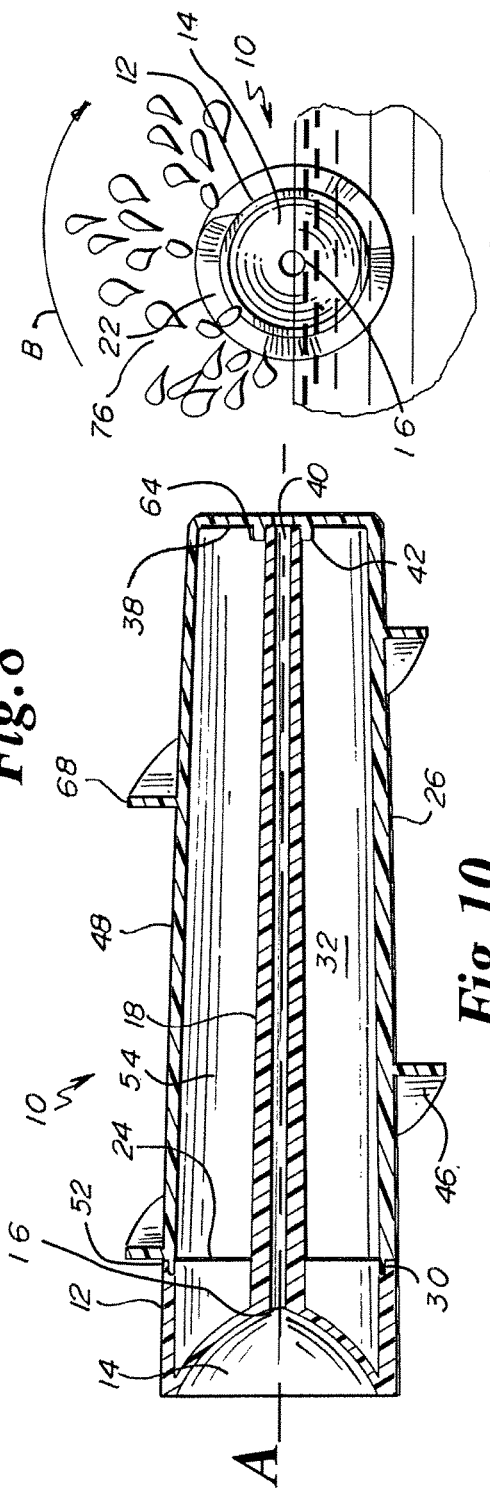

FISHING BOBBER

BACKGROUND OF THE INVENTION

The present invention relates to fishing tackle, and more particularly to a fishing bobber capable of providing multiple fish attracting actions previously not available in prior art bobbers in addition to keeping the bait off the bottom of the body of water being fished.

The use of fishing bobbers is well known. Some bobbers clip onto the fishing line a certain distance from the hook and bait, usually less than the depth of the body of water being fished, to keep the hook and bait off the bottom. Bobbers take many shapes including pencil, spherical, egg, tapered and ovoid. Other bobbers slide on the fishing line limiting their movement by a bobber stopper, such as a knot and a bead, swivel or the like, which holds the bobber to a certain depth while allowing the fisherman or angler to fully wind up the fishing line onto a reel. This type of bobber is called a slip bobber and again requires some type of a bobber stopper which can be adjusted to the appropriate depth desired for the anglers bait. Another type of bobber includes plastic hollow bobbers with weights which keep the bobber upright in the water. Hollow plastic bobbers might include weights inside the bobber to create some noise when they are reeled in by the angler.

Different fishing tactics are generally used by anglers in inland salt water bodies of water and their tributaries than those found in fresh water lakes and their tributaries. Bobbers have generally been designed to keep the bait from the bottom and are used in both fresh water and salt water angling. However, over the past two decades there has been a rise in the use of bobbers in inland salt waters to 'attract' fish. In the fishing industry they are known as popping bobbers. There are different popping bobbers. Some are made of styrofoam which slide up and down on a wire and some have an additional weight and/or plastic beads on the line under the bobber or on the wire that creates a noise when jerked. This noise mimics the sound of a shrimp jumping out of the water when fleeing from prey fish. Styrofoam bobbers easily get beaten up and deteriorate rather quickly. Another type of bobber has an concave scoop or semi-spherical cut out on top which splashes water when jerked to mimic the action of a wounded fish on top of the water.

Popping bobbers on a wire which protrudes out a few inches above and below the bobber require the angler to retie the bait to make depth adjustments. Also, during normal usage the wire bends over time impeding the bobber's, and any attached weights and bead's, ability to freely slide up and down the wire thereby deterring its ability to produce the desired level of sound.

There is a need for a durable fishing bobber that has the benefits of all past known bobbers without the necessity of a wire and that produces a splashing effect, rattling, clicking and popping sounds and has a helical fin that spins the bobber to churn the water, generate vibrations and further create buzzing sound to mimic a school of fish in flight from predator fish.

SUMMARY OF THE INVENTION

A hollow-bodied frustoconical fishing bobber has a top section with a semi-spherical or concave top surface with a line aperture in the bottom of the top surface and a depending tube through which a fishing line may extend. Below the top section are two hollow semi-cylindrical halves with bottom walls that are joinable together and connectable to the bottom of the top section with the depending tube passing through and ending at the joinable bottom walls. A continuous helical fin in three sections is on the outer surface of the top section and two semi-cylindrical halves which causes the fishing bobber to spin about its radial axis. Weights are located in the hollow body.

A principle object and advantage of the present invention is that helical fin causes the bobber to spin to churn the water, generate vibrations and further create buzzing sound to mimic a school of fish in flight from predator fish.

Another principle object and advantage of the present invention is that it functions simply with a fishing line passing through it without the need for a mounting wire.

Another principle object and advantage of the present invention is that the bobber produces a splashing effect, rattling, clicking and popping sounds and has a helical fin that spins the bobber to churn the water, generate vibrations and further create buzzing sound all in one bobber.

Another principle object and advantage of the present invention is that the bobber can be made of durable plastic for long life of fishing service.

Another principle object and advantage of the present invention is that the bobber produces more action than any other prior art bobber to include popping, splashing, churning, clicking, rattling, vibrating and buzzing, due to the rotating design.

Another principle object and advantage of the present invention is that only minor movement of the fishing pole apparatus is needed to produce fish attracting effects, thus creating less aggravation to live bait thereby keeping it fresher longer.

Another principle object and advantage of the present invention is that the bobber is to be used for floating the end of a fishing line and to be used to attract prey fish in salt and/or fresh water bodies of water.

Another principle object and advantage of the present invention is that bobber has a low cost of manufacture with regard to both materials and labor, and which accordingly is then susceptible of lower sales prices than other competing bobbers, which are expensive, thereby making the fishing bobber economically available to the buying public.

Another principle object and advantage of the present invention is that when still fishing with the bobber, predator fish that are passing by, or are nearby, may not locate the anglers bait. When the angler slightly jerks the rod, the bobber invention goes to into motion thereby alerting passing by fish to the presence of the angler's bait.

Another principle object and advantage of the present invention is that an additional application of the bobber includes using a much smaller bobber of the present invention placed on the string between the bait and the bobber. When static, the smaller bobber remains under the large bobber. When the line is pulled by the angler, the smaller version actually spins and slides down on the string between the bobber and jig portraying a bug being chanced by the jig when casting and retrieving.

Another principle object and advantage of the present invention is that larger versions of the bobber can also be used by anglers as teasers for offshore applications. By placing them several yards in front of the lure or bait, they will enhances fish attracting capabilities when trolling.

BRIEF DESCRIPTION OF THE DRAWINGS

FIG. 8 is a right side perspective view of the present invention bobber in actual fishing mode in the water showing the splashing action of the larger bobber and the 'bug' trailing action of the small bobber there behind;

FIG. 9 is a top plan view taken along lines 9-9 of FIG. 8 showing the present invention bobber in active reeling in fishing use in the water showing the splashing action of the larger bobber; and FIG. 10 is a cross sectional view of the present invention taken along lines 10-10 of FIG. 2;

DETAILED SPECIFICATION

Figure 1:
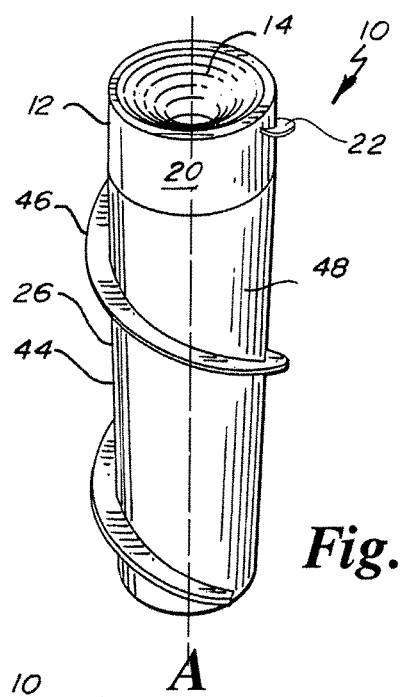
FIG. 1 is a front perspective view of the present invention comprising a fishing bobber.
Figure 2:
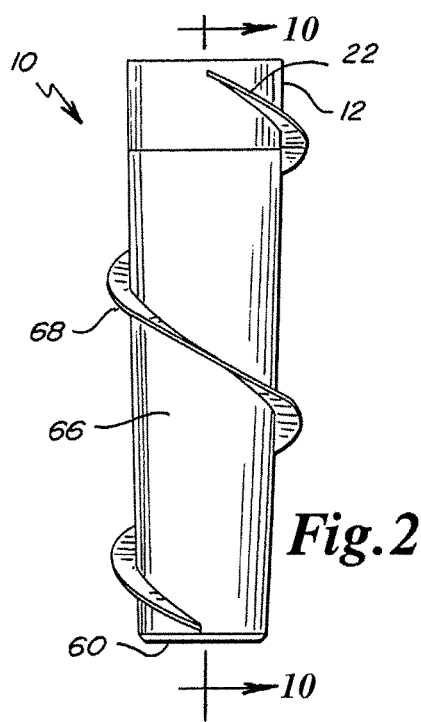
FIG. 2 is a front elevational view of the present invention.
Figure 3:
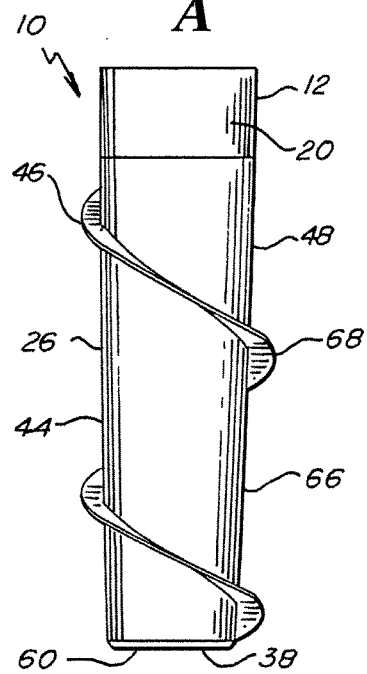
FIG. 3 is a rear elevational view of the present invention.
Figure 4:
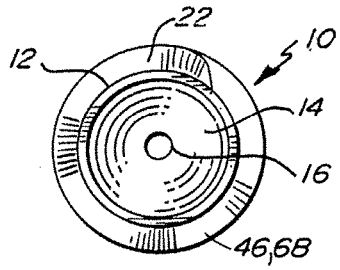
FIG. 4 is a top plan view of the present invention.
Figure 5:
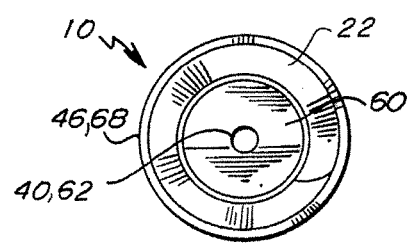
FIG. 5 is a bottom plan view of the present invention.

Referring to FIGS. 1-5, 7 and 10, the parts, configuration and assembly the fishing bobber 10 of the present invention may be seen and understood. Fishing bobber 10 is suitably made of durable molded plastic, such as polystyrene, polycarbonate or the like. The bobber 10 is hollow and slightly frustoconical in shape for unique action in water. Longitudinal axis A runs the length of bobber 10. Bobber 10 has illustrated 3 molded parts including top section 12, first semi-cylindrical section 26 and second semi-cylindrical section 48. Conceivably, semi-cylindrical sections 26 and 48 could be one piece. Helical fin sections 22, 46 and 68 continuously wrap around bobber 10 for rotational action when pulled in water.

Top section 12 has a concave, hemispherical or scoop top surface 14 for splashing action in water explained further below. In the bottom of the scoop 14 is line aperture 16. In flow communication with aperture 16 is depending tube 18 for fishing line to pass therethrough. Top 12 has an outer surface 20 with the beginning of a continuous helical fin section 22.

Figure 7:
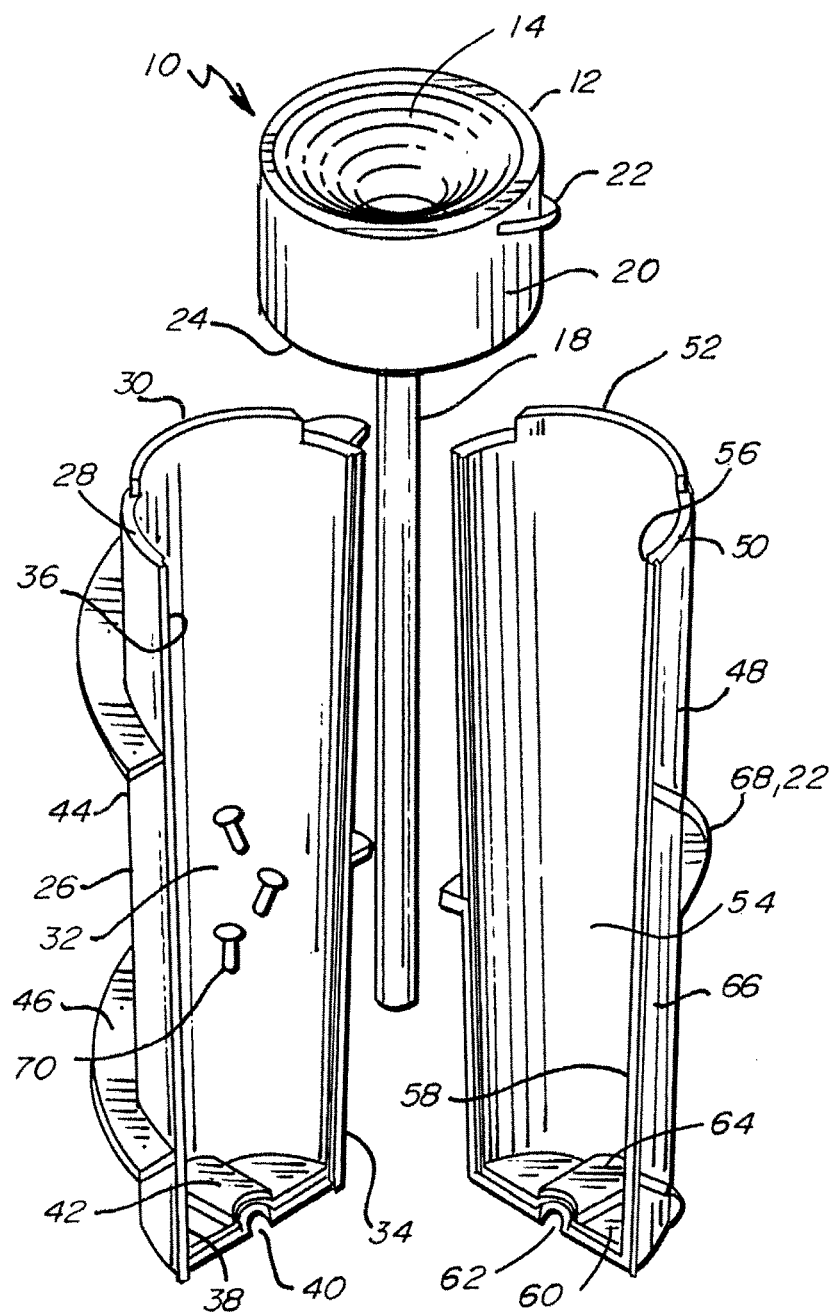
FIG. 7 is a front perspective view of the present invention of FIG. 1 in an exploded condition.

First cylindrical half section 26 has a top edge 28 whereat is located a upper flange 30 that will index into the interior of bottom edge 24 of top section 12 (FIG. 7). Half section 26 has a hollow interior 32. Generally shown, vertical flange edges 34 are supported on vertical edges 36 depending the length of the half section 26. Bottom wall 38 closes the bottom of the half section 26 but has semi-circular line aperture 40 whereat depending tube 18 passes through and sealably ends. Within the interior 32 and on bottom wall 38 is a transverse bottom ledge 42 for kicking up asymmetrical weights 70 explained below. On the outer surface 44 is located a helical fin section 46.

Second cylindrical half section 48 has a top edge 50 whereat is located a upper flange 52 that will index into the interior of bottom edge 24 of top section 12 (FIG. 7). Half section 48 also has a hollow interior 54. Generally shown, vertical flange edges 56 are supported on vertical plain edges 58 depending the length of the half section 48. By this arrangement, the first half section 26 and second half section nest together and with top section 12. Bottom wall 60 closes the bottom of the half section 26 but has semi-circular line aperture 40 whereat depending tube 18 is joined and ends open to the environment. Within the interior 32 and on bottom wall 38 is a transverse bottom ledge 42 for kicking up weights 70 explained below. The top section 12 closes the interior 32 and 54 with first and second half sections 26 and 48. Before sealing the parts together, asymmetrical weights 70 (suitably three) are placed into the hollow interior 32 and 54. There after sonic welding or glue may be used to permanent seal all edges 24, 36 and 58 together.

Figure 6:
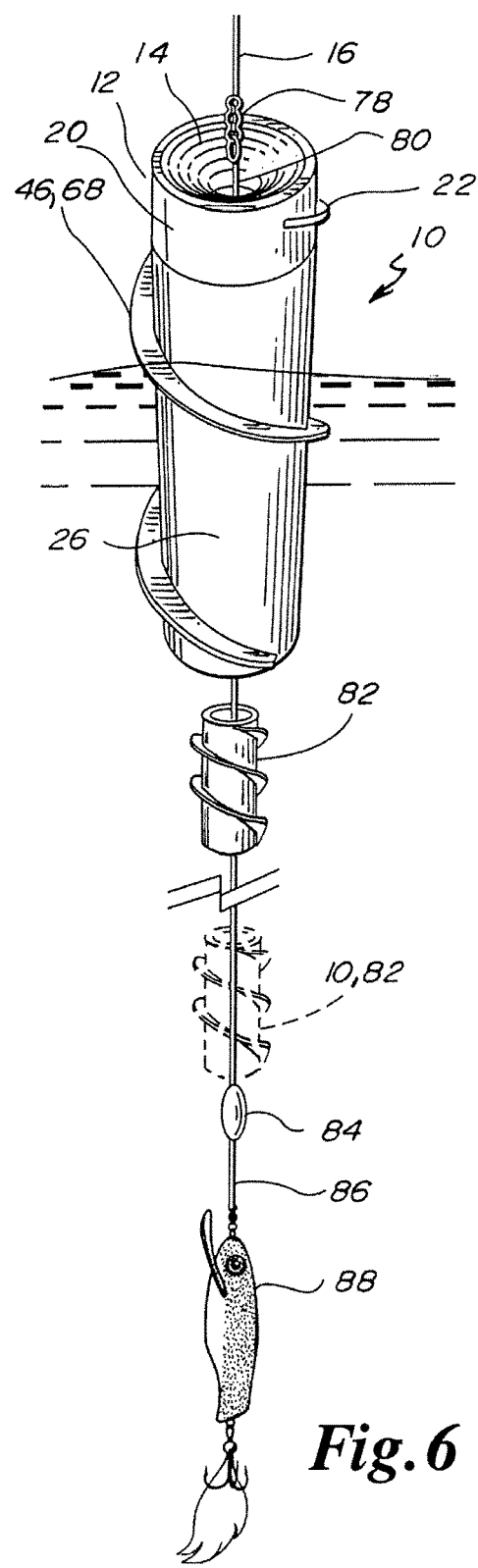
FIG. 6 is a right side perspective view of the present invention bobber in static fishing use sitting in the water.

The rigging, operation and unique actions of the fishing bobber 10 may be appreciated with viewing of FIGS. 6, 8 and 9. First, fishing line 76 from the reel and rod is fed through the rod eyelets. The reel line 76 is then tied to a swivel 78. The other end of swivel 78 is tied to the bobber 10 support line 80, which may be of a more heavy duty fishing line or a wire. This is the choice of the angler or fisherman. The bobber support line 80 may be then tied to a second swivel 84. The other side of the swivel 84 is then tied to a fishing bait line 86 that is tied to bait, hook or jig—whatever the fisherman is using to catch fish. Optionally, a small 'bug-like' bobber 82 may be freely slid onto the bobber support line 80 between bobber 10 and swivel 84.

When the bobber 10 and bait 88 is cast to a point in the water, the bait sinks and is supported in vertical suspension by bobber 10 as shown in FIG. 6. If the little 'bug-like' bobber 82 is used, it floats up to and underneath the main bobber 10 freely on bobber support line or wire 80. When the fisherman jerks the fishing line 76, the bobber 10 is jerked and the weights 70 are kicked off the bottom wall 38 and 60 causing a clicking sound. If the fishing line 76 is more violently jerked, the bobber 10 tips over and also makes a splash as the water is thrown out of the concave top scoop 14 in addition to the clicking sound.

If the fisherman starts to reel in the line 76, even if occasionally stops, the bobber 10 begins to rotate alone axis A and arrow B further causing a front splashing effect by the top scoop 14 and shown in FIG. 9. Simultaneously, the rotation of bobber 10 by action of the helical fin 22, 46 and 68, causes the weights to rattle inside the hollow interior 32 and 54. Also, the fin causes the water to splash outwardly in a churning fashion thereby creating a popping, splashing, churning, clicking, rattling, vibrating, buzzing and humming action. If the optional little 'bug-like' bobber 82 is used, it slides downwardly toward the bait 88 mimicking that the bait 88 is chasing the bug bobber 82.

When still fishing, predator fish that are passing by, or are nearby may not locate the anglers bait 88. When the angler or fisherman slightly jerks the rod, the bobber 10 goes to into motion thereby alerting passing by fish to the presence of the anglers bait 88. When using a cast and retrieve method the increased pole action on the bobber 10 intensifies all the action attributes of the bobber to attract prey fish. Using the much smaller 'bug' bobber 82 placed on the line 80 between the swivel 84 and the bobber 10, the smaller version 82 actually spins and slides up and down between the bobber 10 and the bait or jig 88 portraying a bug being chanced by the jig when casting and retrieving.

Larger versions of the bobber 10 can also be used by anglers as teasers for offshore applications. By placing them several yards in front of the lure or bait 88, the bobber will enhances fish attracting capabilities when trolling. More specifically, the bobber 10 may be produced in a large size (approximately 10+ inches) which can also be used in salt water as an off-shore teaser bobber 10. Teasers are generally relative in size to the bait 88 being trolled and are place several yards in front of the bait 88 to attract prey. Varying the depth and angle of the helical fin 22, 46 and 68 will change and allows for varying action in the water in proportion to the speed of the boat (i.e., the less protrusion and greater the degree of the angle of the protrusion, the faster it can be trolled with desired effect). The bobber 10 will jump frantically in and out of the water mimicking fleeing bait. It also produces vibrations from its rotating actions and additional sounds from the marbles or weights being agitated from the spinning motion. Additionally, the scoop 14 on top of the bobber 10 catches and splashes water as it jumps in and out of the water while being pulled at a high speed (generally 9 to 12 knots). This size of the bobber 10 can also be used as a float like previously described for large live baits similar in size of the bobber 10, for example a 12-14 inch sucker minnows used for larger Muskie in fresh water, or other similar sized large fresh or salt water bait fish.

For other live bait applications, the choice of bobber 10 size should be similar in size to the length of bait while maintaining enough buoyancy to keep the bobber 10 from sinking. Bobbers 10 should be stationary and using weights in proportionate size for the bait to be enough to stop the bait from swimming on top of the water, and heavy enough to be able to hold them in place keeping them from swimming out of the desired location. Optimally, bobbers 10 should be placed near a drop off or ledge, a fallen tree, where more than one body of water meets another, or somewhere game fish are known to be found. No other bobber on the market will attract fish when slightly jerked as well as bobber 10 due to its unique design.

To attract predatory fish, the angler needs only jerk the end of the pole a few inches to get the desired effect (splashing, rattling, and buzzing). By using a slight twitch of a few inches, your live bait fish will experience minimum stress and stay fresh, thereby being more desirable to game fish. No other prior art provides as much action with as little movement from the anglers pole to reduce stress to the live bait. This not only keeps your bait fish alive and fresh longer thereby reducing costs for bait fish, it also increases the odds of catching fish as it attracts prey fish in the vicinity that may never have found your bait.

The smallest bobber 80 is the 'chase' or 'bug' bobber. It is not used as a float to keep the bait 88 on the bottom; rather it is designed solely to be used with another popping bobber 10 in the cast and retrieve, or jigging method of angling. It is too small to contain inserted weights; however, it has all the other attributes of the larger bobbers 10. It is threaded on the string as other slip bobbers, placed between the bobber 10 and bait 88. When motionless the smaller buoyant 'chase' bobber 88 and will slide up the string 80 stopping at the larger fixed bobber 10. While retrieving, lifting the rod from the lateral to vertical position or when retrieving the line 76 with the reel, water resistance pushes the chase bobber 82 down to the bait 88 located at the end of line 86. Also, this action creates a prey fish attracting vibration via the spinning motion through the water via the helical fin 22, 46 and 68. Bringing the rod back from the vertical to lateral position, gravity pulls the jig 88 down, the angler may reel in the loose line, while the small buoyant chase bobber 82 again floats up the line stopping at the bobber 10. This repeated motion is associated with the cast and retrieve method. An angler can add the smallest chase bobber 82 to any prior art popping bobber rig to enhance fish attracting capabilities. Using the bobber 10 along with its splashing, spinning, and sound generating characteristics and the smallest chase bobber 82, creates the ultimate effect.

The above disclosure and accompanying Figs. are for illustrative purposes only. The true scope of the present invention been defined by the following claims.

What is claimed:
1. A hollow-bodied fishing bobber, comprising:
 a.) a top cylindrical section with a semi-spherical concave top surface having a line aperture in bottom of the concave surface and a depending tube in flow communication with the aperture through which a fishing line may slidably extend, the top section having an outer surface;
 b.) a bottom cylindrical section with a bottom wall having a second aperture whereat the tube passes through and ends when the top and bottom cylindrical sections are joined, the bottom cylindrical section having an outer surface;
 c.) a continuous helical fin on at least one of the outer surfaces of the top and bottom sections which causes the fishing bobber to spin about it radial axis; and
 d.) weights being locating within the hollow bodied fishing bobber for making clicking noises.

2. The hollow-bodied fishing bobber of claim 1, wherein the cylindrical sections are frustoconical.

3. The hollow-bodied fishing bobber of claim 1, wherein the bottom cylindrical section comprises two hollow semi-cylindrical halves that are sealably joinable together.

4. The hollow-bodied fishing bobber of claim 3, wherein the continuous helical fin is in three sections on the outer surfaces of the top section and two semi-cylindrical halves.

5. The hollow-bodied fishing bobber of claim 1, wherein the weights are asymmetrical.

6. A frustoconical hollow-bodied fishing bobber, comprising:
 a.) a top cylindrical section with a semi-spherical concave top surface having a line aperture in bottom of the concave surface and a depending tube in flow communication with the aperture through which a fishing line may slidably extend, the top section having an outer surface;
 b.) a bottom cylindrical section with a bottom wall having a second aperture whereat the tube passes through and ends when the top and bottom cylindrical sections are joined, the bottom cylindrical section having an outer surface;
 c.) a continuous helical fin on at least one of the outer surfaces of the top and bottom sections which causes the fishing bobber to spin about it radial axis; and
 d.) weights being locating within the hollow bodied fishing bobber for making clicking noises.

7. The hollow-bodied fishing bobber of claim 6, wherein the bottom cylindrical section comprises two hollow semi-cylindrical halves that are sealably joinable together.

8. The hollow-bodied fishing bobber of claim 7, wherein the continuous helical fin is in three sections on the outer surfaces of the top section and two semi-cylindrical halves.

9. The hollow-bodied fishing bobber of claim 6, wherein the weights are asymmetrical.

10. A frustoconical hollow-bodied fishing bobber, comprising:
 a.) a top cylindrical section with a semi-spherical concave top surface having a line aperture in bottom of the concave surface and a depending tube in flow communication with the aperture through which a fishing line may slidably extend, the top section having an outer surface;
 b.) a bottom cylindrical section with a bottom wall having a second aperture whereat the tube passes through and ends when the top and bottom cylindrical sections are joined and the bottom cylindrical section having an outer surface wherein the bottom cylindrical section comprises two hollow semi-cylindrical halves that are sealably joinable together;
 c.) a continuous helical fin on at least one of the outer surfaces of the top and bottom sections which causes the fishing bobber to spin about it radial axis; and d.) weights being locating within the hollow bodied fishing bobber for making clicking noises.

11. The hollow-bodied fishing bobber of claim 10, wherein the continuous helical fin is in three sections on the outer surfaces of the top section and two semi-cylindrical halves.

12. The hollow-bodied fishing bobber of claim 10, wherein the weights are asymmetrical.

\* \* \* \* \*